(12) United States Patent
Talbert et al.

(10) Patent No.: US 10,138,614 B2
(45) Date of Patent: Nov. 27, 2018

(54) PILE INSERTION

(71) Applicant: MMI Engineering Limited, Warrington (GB)

(72) Inventors: Duncan David Talbert, Warrington (GB); David John Sanderson, Warrington (GB); Michael Vincent Hasson, Warrington (GB)

(73) Assignee: MMI Engineering Limited, Warrington (GB)

( * ) Notice: Subject to any disclaimer, the term of this patent is extended or adjusted under 35 U.S.C. 154(b) by 0 days.

(21) Appl. No.: 15/114,784

(22) PCT Filed: Jan. 27, 2015

(86) PCT No.: PCT/GB2015/050178
§ 371 (c)(1),
(2) Date: Jul. 27, 2016

(87) PCT Pub. No.: WO2015/110842
PCT Pub. Date: Jul. 30, 2015

(65) Prior Publication Data
US 2016/0348332 A1 Dec. 1, 2016

(30) Foreign Application Priority Data

Jan. 27, 2014 (GB) .................. 1401286.8

(51) Int. Cl.
*E02D 7/22* (2006.01)
*E02D 5/56* (2006.01)
(Continued)

(52) U.S. Cl.
CPC .................. *E02D 7/26* (2013.01); *E02D 5/56* (2013.01); *E02D 7/22* (2013.01); *E02D 27/525* (2013.01); *F03D 13/22* (2016.05); *F03D 13/25* (2016.05)

(58) Field of Classification Search
CPC .. E02D 5/56; E02D 7/22; E02D 27/52; E02D 27/525
(Continued)

(56) References Cited

U.S. PATENT DOCUMENTS 4,417,664 A * 11/1983 Gordon .................. B66C 23/52
212/307
4,537,536 A * 8/1985 Tsubonuma .............. E02D 5/18
405/240

(Continued)

FOREIGN PATENT DOCUMENTS

DE 10201400298 * 3/2015
JP 60062333 A * 4/1985 ............. E02D 17/13
(Continued)

OTHER PUBLICATIONS

International Search Report and Written Opinion for International Application No. PCT/GB2015/050178, dated Apr. 17, 2015.
(Continued)

*Primary Examiner* — Frederick L Lagman
(74) *Attorney, Agent, or Firm* — Marshall, Gerstein & Borun LLP

(57) ABSTRACT

A method of manufacturing a sub-aqua foundation including:
  simultaneously inserting one or more first helical piles and one or more second helical piles into the sub-aqua earth via a common inserting apparatus, wherein a first helical pile has one or more clockwise helices and wherein a second helical pile has one or more counter-clockwise helices.

19 Claims, 16 Drawing Sheets

(51) Int. Cl.
  E02D 27/52 (2006.01)
  E02D 7/26 (2006.01)
  F03D 13/20 (2016.01)
  F03D 13/25 (2016.01)

(58) Field of Classification Search
  USPC .................. 405/224.1, 227, 228; 114/296
  See application file for complete search history.

(56) References Cited

U.S. PATENT DOCUMENTS

| | | | | |
|---|---|---|---|---|
| 4,662,792 | A * | 5/1987 | Gessay | E02D 5/18 |
| | | | | 405/233 |
| 4,906,142 | A * | 3/1990 | Taki | E02D 5/18 |
| | | | | 405/233 |
| 4,907,912 | A * | 3/1990 | Smith | E02L 317/021 |
| | | | | 141/82 |
| 4,909,675 | A * | 3/1990 | Taki | E02D 5/20 |
| | | | | 405/241 |
| 5,378,085 | A * | 1/1995 | Kono | E02D 3/126 |
| | | | | 405/233 |
| 5,738,465 | A * | 4/1998 | Gessay | E02D 5/18 |
| | | | | 299/57 |
| 6,273,645 | B1 * | 8/2001 | Hamre | B63B 21/26 |
| | | | | 114/265 |
| 6,481,932 | B1 * | 11/2002 | Riemers | E02L 317/021 |
| | | | | 114/266 |
| 7,635,239 | B2 * | 12/2009 | Lawler | E02D 27/52 |
| | | | | 405/224 |
| 2011/0170956 | A1 * | 7/2011 | Vandenbulcke | E02D 27/42 |
| | | | | 405/227 |
| 2012/0163921 | A1 * | 6/2012 | Ditillo | E02D 7/22 |
| | | | | 405/232 |

FOREIGN PATENT DOCUMENTS

| | | | |
|---|---|---|---|
| JP | 02243819 A | * | 9/1990 |
| JP | 2004270212 A | | 9/2004 |
| KR | 20130085354 A | | 7/2013 |
| WO | WO-86/01556 A1 | | 3/1986 |

OTHER PUBLICATIONS

International Preliminary Report on Patentability for Application No. PCT/GB2015/050178, dated Aug. 2, 2016.

\* cited by examiner

PILE INSERTION

TECHNOLOGICAL FIELD

Embodiments of the present invention relate to the insertion of piles into the earth.

BACKGROUND

A pile is an elongate member that is inserted into the earth to form a foundation for another structure.

Piles may be hammered into position.

Applying the necessary hammer impulse may be difficult or undesirable in some circumstances.

BRIEF SUMMARY

According to various, but not necessarily all, embodiments of the invention there is provided a method of manufacturing a sub-aqua foundation comprising:

simultaneously inserting one or more first helical piles and one or more second helical piles into sub-aqua earth via a common inserting apparatus, wherein a first helical pile has one or more clockwise helices and wherein a second helical pile has one or more counter-clockwise helices.

According to various, but not necessarily all, embodiments of the invention there is provided an apparatus, for simultaneously inserting multiple helical piles into the earth, comprising: a body comprising at least a first aperture for receiving a first helical pile having one or more clockwise helices and a second aperture for receiving a second helical pile having one or more counter-clockwise helices;

first guides associated with the first aperture; second guides associated with the second aperture; a first drive carriage configured to move linearly relative to the first aperture of the body along the first guides and to rotate simultaneously the received first helical pile in a clockwise sense; and a second drive carriage configured to move linearly relative to the second aperture of the body along the second guides and to rotate simultaneously the received second helical pile in a counter-clockwise sense.

According to various, but not necessarily all, embodiments of the invention there is provided an apparatus comprising: a drive carriage configured to move linearly relative to an aperture of a body along guides and configured to simultaneously rotate a received helical pile in either a clockwise sense or a counter-clockwise sense.

According to various, but not necessarily all, embodiments of the invention there is provided a kit of parts comprising: multiple helical piles configured for insertion into sub-aqua earth via a common inserting apparatus, and comprising at least a first helical pile having one or more clockwise helices and at least a second helical pile having one or more counter-clockwise helices.

According to various, but not necessarily all, embodiments of the invention there is provided a kit of parts for a particular inserting apparatus comprising: multiple helical piles configured for insertion into sub-aqua earth via the common inserting apparatus, and comprising one or more first helical piles having one or more clockwise helices and one or more second helical piles having one or more counter-clockwise helices, wherein the number of first helical piles and the number of second helical piles is dependent upon the particular inserting apparatus.

According to various, but not necessarily all, embodiments of the invention there is provided a method comprising: controlling simultaneous insertion of multiple helical piles into the earth via a common inserting apparatus comprising: controlling at least a first helical pile to rotate in a clockwise sense and controlling at least a second helical pile to rotate in an counter-clockwise sense.

According to various, but not necessarily all, embodiments of the invention there is provided an apparatus comprising: at least one processor; and at least one memory including computer program code the at least one memory and the computer program code configured to, with the at least one processor, cause the apparatus at least to perform the method.

According to various, but not necessarily all, embodiments of the invention there is provided a method of inserting comprising: simultaneously inserting multiple helical screws into the earth via a common inserting apparatus, wherein at least a first helical screw of the multiple helical screws has at least one clockwise helix and wherein at least a second helical pile of the multiple helical piles has at least one counter-clockwise helix.

BRIEF DESCRIPTION

For a better understanding of various examples that are useful for understanding the brief description, reference will now be made by way of example only to the accompanying drawings in which.

DETAILED DESCRIPTION

Figure 1:
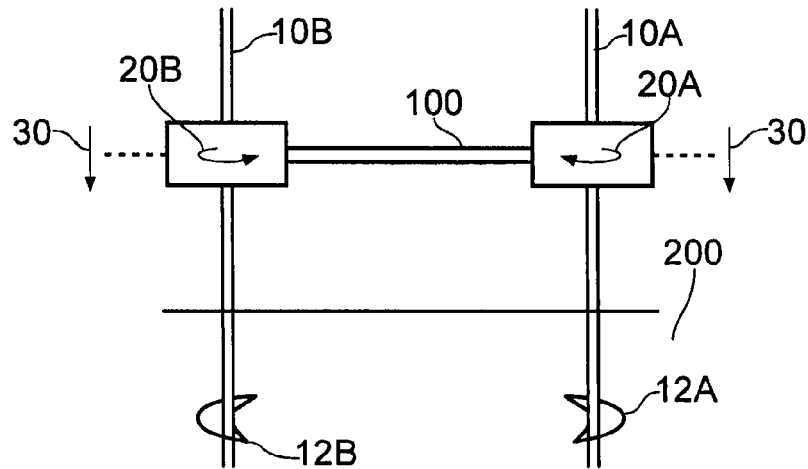
FIG. 1 illustrates an example of a method of manufacturing a foundation using a single inserting apparatus and first and second helical piles of opposite thread.

FIG. 1 illustrates an example of a method of manufacturing a foundation. The method comprises simultaneously inserting one or more first helical piles 10A and one or more second helical piles 10B into the earth 200 via an inserting apparatus 100. A single inserting apparatus 100 is used in common for all of the helical piles 10 including the first helical piles 10A and the second helical piles 10B.

A first helical pile 10A has one or more clockwise helices 12A.

A second helical pile 10B has one or more counter-clockwise helices 12B.

The helical piles are inserted simultaneously via the common inserting apparatus 100. The first helical piles 10A are rotated in a clockwise sense 20A during insertion. The second helical piles 10B are rotated in a counter-clockwise sense 20B during insertion.

The first helical piles 10A are simultaneously driven linearly 30 in an axial direction towards the earth 200 and driven clockwise 20A.

The second helical piles 10B are simultaneously driven linearly 30 in an axial direction towards the earth 200 and driven counter-clockwise 20B.

This balanced insertion of the first helical piles 10A and the second helical piles 10B into the earth 200 via the inserting apparatus 100 reduces the net torque on the apparatus 100 as explained with reference to FIGS. 2A and 2B.

Figure 2A:
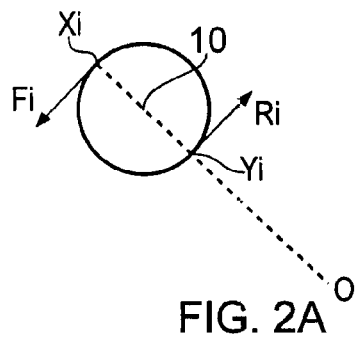
FIG. 2A illustrates, as an example, an arbitrary ith helical pile of 2N helical piles that will be inserted simultaneously into the earth via an apparatus.

FIG. 2A illustrates an arbitrary ith helical pile 10 of N helical piles that will be driven simultaneously into the earth 200 via the apparatus 100. Driving rotation of the helical pile 10 produces a tangential force Fi at tangential point xi (measured from a centre of mass of the apparatus 100) and produces a tangential force −Ri at a tangential point yi (measured from a centre of mass of the apparatus 100). The net torque applied by the apparatus 100 at the ith helical pile 10 is the sum of the torque associated with the force Fi and xi and the torque associated with the force Ri and yi. The net torque T applied to the apparatus by all N driven helical piles is the summation of the net torques for each helical pile 10.

Figure 2B:
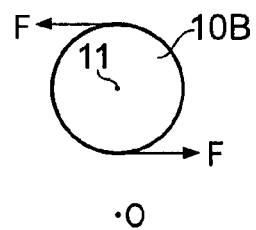
FIG. 2B illustrates an example of balanced insertion in which the same torques but in opposite senses are applied simultaneously to a first helical pile and a second helical pile.
Figure 2B:
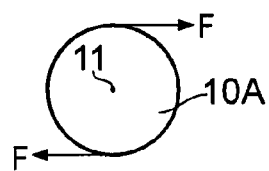

FIG. 2B illustrates an example in which the same torques but in opposite senses are applied to the first helical pile 10A (clockwise torque) and the second helical pile 10B (counter-clockwise torque). The net torque T applied to the apparatus 100 is small.

The use of balanced insertion of piles 10 (using helical piles having helices of opposite sense and inserting them by rotating them in opposite senses) results in the inserting apparatus 100 being subjected to less torque. It is therefore possible to use portable inserting apparatus 100 and locate them adjacent the earth 100.

This is particularly advantageous in sub-aqua environments. In this case the earth 200 is the sub-aqua earth. In a subsea environment the earth 200 is a seabed. The helical piles 10 may need to satisfy some size and strength constraints to make them suitable for sub-aqua, and in particular subsea use.

It should be appreciated that the N helical piles that are simultaneously driven may be in an arrangement that involves one or more of the helical piles being driven counter-clockwise and one or more of the helical piles being driven clockwise.

The N piles (or a sub-set of the N piles) are inserted using balanced insertion such that the net torque applied to the N piles (or sub-set of the N piles) is zero or small.

In some embodiments, N may be an even number and the helical piles may be paired. One pile in each pair may oppose the other pile of the pair across a central axis shared with the other pairs of piles. The pairs of piles may be inserted using balanced insertion such that the net torque applied to each pair is zero or small.

Figure 3:
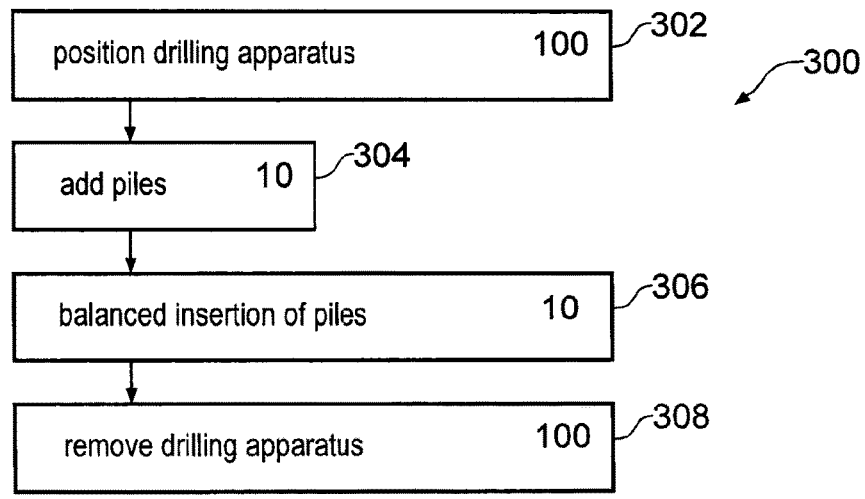
FIG. 3 illustrates an example of a method of using balanced insertion to insert helical piles in a sub-aqua, for example a subsea, environment.

FIG. 3 illustrates a method 300 of using balanced insertion to insert helical piles 10 in a sub-aqua, for example a subsea environment.

At block 302, the inserting apparatus 100 is positioned adjacent the sub-aqua earth 200. This may, for example, be achieved by flooding ballast tanks to sink the apparatus 100 or lowering the apparatus from the surface of the water. The apparatus 100 may then be leveled in situ. This ensures that helical piles 10 will be inserted vertically.

At block 304 the helical piles 10 are added to the inserting apparatus 100. It may be important that the first helical pile(s) 10A are located at particular positions and that the second helical pile(s) 10B are located at particular positions to achieve a desired net torque T.

At block 306, the piles 10 are inserted simultaneously into the sub-aqua earth 200 using balanced insertion. The first helical pile(s) 10A are rotated clockwise while they are being inserted and the second helical pile(s) 10B are simultaneously rotated counter-clockwise while they are being inserted.

In some embodiments, it may be desirable to interconnect helical piles 10 lengthwise to achieve longer sections of inserted pile. In such cases blocks 304 and 306 are repeated.

Once the helical piles 10 have been inserted to the required depth, the method moves to block 308 where the inserting apparatus 100 is removed. This may, for example, be achieved by floating the inserting apparatus 100 by displacing water in ballast tanks with air or other gas.

Figure 4A:
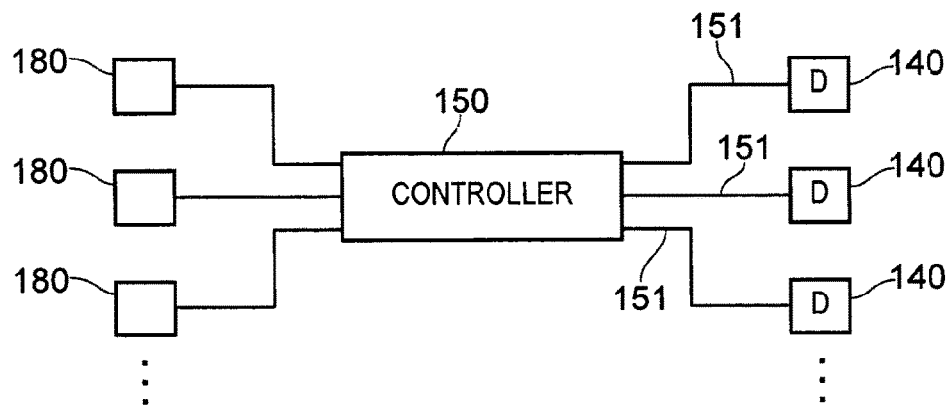
FIG. 4A illustrates an example of a control system.

In order to achieve and maintain a desired net torque T it may be desirable to use a controller 150, for example as illustrated in FIG. 4A to achieve and maintain a desirable net torque T during balanced insertion of the helical piles 10.

In FIG. 4A, the controller 150 provides output control signals 151 to drivers 140. The drivers 140 are used to control balanced insertion of the helical piles 10.

At least some of the drivers 140, which may be called rotation drivers, under the control of controller 150 may, for example control for each helical pile 10 some or all of: its direction of rotation, the torque with which it is rotated.

At least some of the drivers 140, which may be called axial drivers, under the control of controller 150 may, for example control for each helical pile 10 the linear axial force applied.

The controller 150 may, for example, be configured to keep the net torque T on the apparatus 100 beneath a threshold value or alternatively at a minimum or zero value during balanced insertion.

The controller 150 may process data from sensors 180 to keep the net torque T at a target value. In some embodiments, the sensors 180 may detect torque at each helical pile 10. The controller 150 may, for example, dynamically control the net torque T on the apparatus 100 using real-time data from each sensor 180.

At least some of the drivers 140, which may be called configuration control drivers, under the control of controller 150 may, for example control a configuration of the apparatus 100, such as whether the apparatus 100 has an inserting configuration or a re-positioning configuration. Examples of these configurations are explained below in relation to FIGS. 5A-5D, FIG. 6, FIGS. 7A-7B, FIGS. 8A-8B and FIGS. 10A-10B.

The configuration control drivers 140, under the control of controller 150 may, for example independently control the locations with which each helical pile 10 is axially aligned.

In at least some of the detailed configurations described below, multiple drivers 140 engage with an external circumferential portion of pile 10 such as a gear. However, there may be alternative means of applying torque to the pile including the use of a single rotation driver 140 centrally mounted within the drive carriage to apply torque to the top of each pile section as it is installed, or the use of one or more rotation drivers 140 that engage with a ring gear within the pile section. Application of the torque via a number of rotation drivers 140 around the pile circumference is the preferred means of applying torque to the pile as the alternatives necessitate the installation of a drive mechanism in the centre of the drive carriage. This in turn presents problems of moving the rotation driver 140 aside to install further pile sections, and in transmitting reaction forces from the rotation driver 140 to the drive carriage.

The controller 150 may be a part of the inserting apparatus 100 or it may be remote from the apparatus 100, for example on a surface vessel. In either case, the inserting apparatus 100 and controller 150 form a system.

Implementation of the controller 150 can be in hardware alone (a circuit, a processor, a hydraulic system), have certain aspects in software including firmware alone or can be a combination of hardware and software (including firmware).

The controller 150 may be implemented using instructions that enable hardware functionality, for example, by using executable computer program instructions in a general-purpose or special-purpose processor that may be stored on a computer readable storage medium (disk, memory etc) to be executed by such a processor.

Figure 4B:
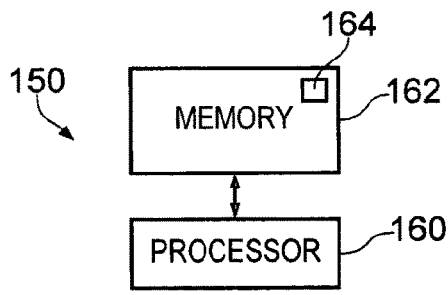
FIG. 4B illustrates an example of a controller.
Figure 4C:
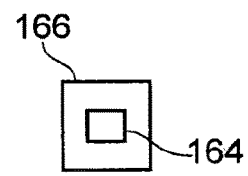
FIG. 4C illustrates an example of a record carrier.

FIG. 4B illustrates one example of a controller 150 comprising a processor 160 and a memory 162.

The processor 160 is configured to read from and write to the memory 162. The processor 160 may also comprise an output interface via which data and/or commands are output by the processor 160 and an input interface via which data and/or commands are input to the processor 160.

The memory 162 stores a computer program 164 comprising computer program instructions (computer program code) that controls the operation of the apparatus 100 when loaded into the processor 160. The computer program instructions, of the computer program 164, provide the logic and routines that enables the apparatus to perform the methods described above. The processor 160 by reading the memory 162 is able to load and execute the computer program 164.

The controller 150 may therefore comprise: at least one processor 160; and at least one memory 162 including computer program code 164, the at least one memory 162 and the computer program code 164 configured to, with the at least one processor 160, cause the apparatus 100 at least to perform:

controlling simultaneous insertion of multiple helical piles into the earth 200 via a common inserting apparatus 100 comprising:

controlling at least a first helical pile 10A to rotate in a clockwise sense and controlling at least a second helical pile 10B to rotate in an counter-clockwise sense.

The computer program 164 may arrive at the apparatus 100 via any suitable delivery mechanism 166. The delivery mechanism 166 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 164. The delivery mechanism may be a signal configured to reliably transfer the computer program 164. The apparatus 100 may propagate or transmit the computer program 164 as a computer data signal.

FIGS. 5A, 5B, 5C and 5D illustrate a cross-section through an example of a inserting apparatus 100 in a sub-aqua environment. The inserting apparatus 100 is configured to simultaneously insert multiple helical piles 10 into the earth 200, for example in a sub-aqua environment, using balanced insertion.

Although the balanced insertion of a first helical pile 10A and a second helical pile 10B are illustrated in this cross-section, it should be appreciated that the inserting apparatus 100 may use balanced insertion to simultaneously insert additional first helical piles 10A and/or second helical piles 10B that are not illustrated.

Once the first helical pile 10A and the second helical pile 10B have been installed by balanced insertion, these piles anchor the apparatus 100 and subsequent piles may, but need not, be installed in a balanced manner.

The inserting apparatus 100 comprises a template or body 110 comprising multiple apertures 112 for receiving helical piles 10. In the portion of the apparatus 100 illustrated there is a first aperture 112A for receiving a first helical pile 10A and a second aperture 112B for receiving a second helical pile 10B.

The first helical pile 10A has one or more clockwise helices 12A. The second helical pile 10B has one or more counter-clockwise helices 12B.

In this example, the clockwise helices 12A of the first helical pile 10A are physically separated in an axial direction, however, that separation is such that the clockwise helices 12A both lie on a virtual clockwise helix of fixed pitch that has its axis aligned with the axis of the first helical pile 10A. The virtual clockwise helix may be a circular helix of fixed radius.

In this example, the counter-clockwise helices 12B of the second helical pile 10B are physically separated in an axial direction, however, that separation is such that the counter-clockwise helices 12B both lie on a virtual counter-clockwise helix of fixed pitch that has its axis aligned with the axis of the second helical pile 10B. The virtual counter-clockwise helix may be a circular helix of fixed radius.

The alignment of the helices of a pile with a virtual helix results in reduced disturbance to the earth 200.

Guides 120 are associated with the apertures 112 and are used to guide drive carriages 130 in a linear axial direction towards and away from their respective apertures 112, while keeping the drive carriage 130 centered on that aperture. For example, first guides 120A are associated with the first aperture 112A. The first guides 120A are configured to guide a first drive carriage 130A in a linear axial direction towards and away from the first aperture 112A, while keeping the first drive carriage 130A centered on the first aperture 112A. Second guides 120B are associated with the second aperture 112B. The second guides 120B are configured to guide a second drive carriage 130B in a linear axial direction towards and away from the second aperture 112B, while keeping the second drive carriage 130B centered on the second aperture 112B.

The first drive carriage 130A is configured to move linearly in an axial direction relative to the first aperture 112A of the body 110 along the first guides 120A while simultaneously driving rotation of the first helical pile 10A, received by the first drive carriage 130A, in a clockwise sense and driving insertion of the first helical pile 10A into the sub-aqua earth 200.

The second drive carriage 130B is configured to move linearly in an axial direction relative to the second aperture 112B of the body 110 along the second guides 120B while simultaneously driving rotation of the second helical pile 10B, received by the second drive carriage 130B, in a counter-clockwise sense and driving insertion of the second helical pile 10B into the sub-aqua earth 200.

Figure 5A:
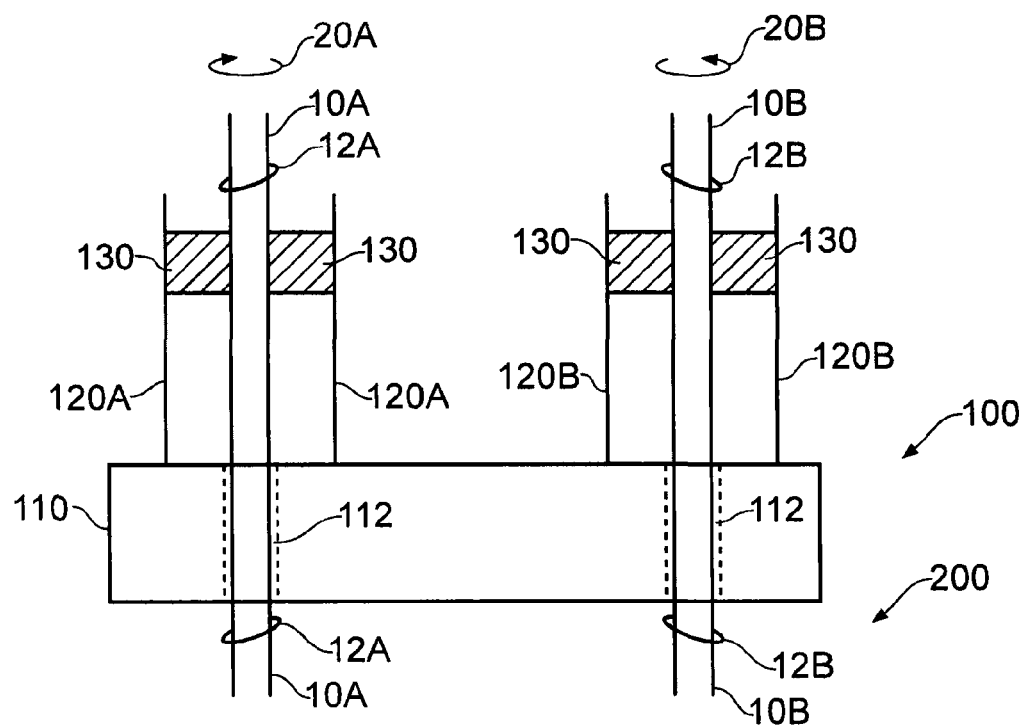
FIGS. 5A, 5B, 5C and 5D illustrate a cross-section through an example of an inserting apparatus in a sub-aqua environment at different times.
Figure 5B:
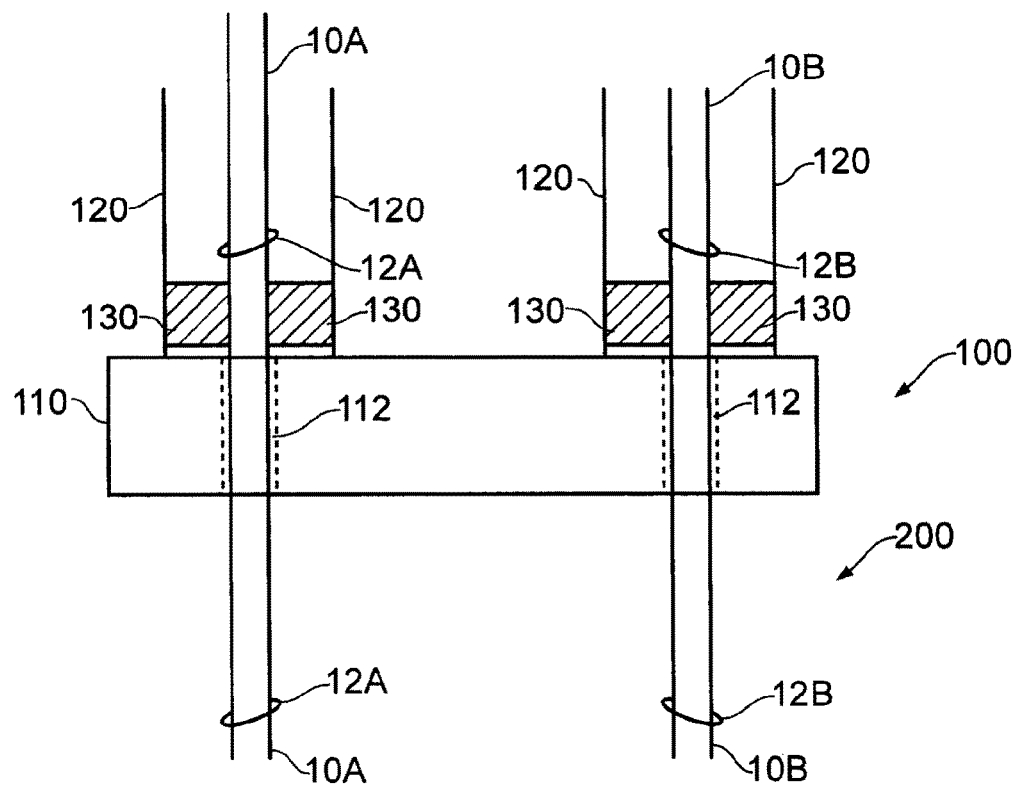

FIGS. 5A and 5B illustrate the apparatus 100 when it is in an insertion configuration. In FIG. 5A, the apparatus 100 is starting a balanced insertion of the helical piles 10. The first drive carriage 130A has a configuration that engages with the first helical pile 10A. The second drive carriage 130B has a configuration that engages with the second helical pile 10B. The first and second drive carriages 130A, 130B simultaneously rotate the first and second helical piles 10A, 10B in different senses while pushing those piles into the sub-aqua earth 200.

As the helical piles 10 are inserted, the first and second drive carriages 130A, 130B move axially along the guides 120 towards the sub-aqua earth 200, and there is no or no significant relative axial movement between the first and second drive carriages 130A, 130B and their respective first and second helical piles. The only significant relative movement between the first and second drive carriages 130A, 130B and their respective first and second helical piles is relative rotational movement caused by the rotation of the helical piles 10 by the drive carriages 130.

In FIG. 5B, the apparatus 100 has finished the balanced insertion of the helical piles 10 and the first and second drive carriages 130 have moved to a lower position compared to FIG. 5A.

Figure 5C:
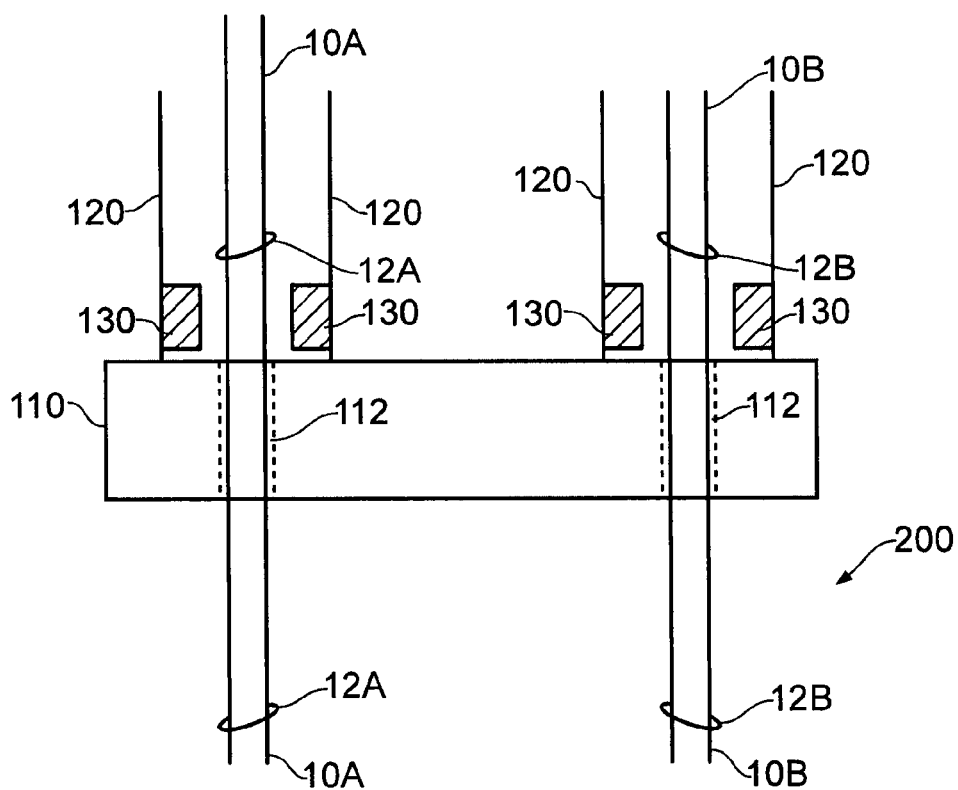
Figure 5D:
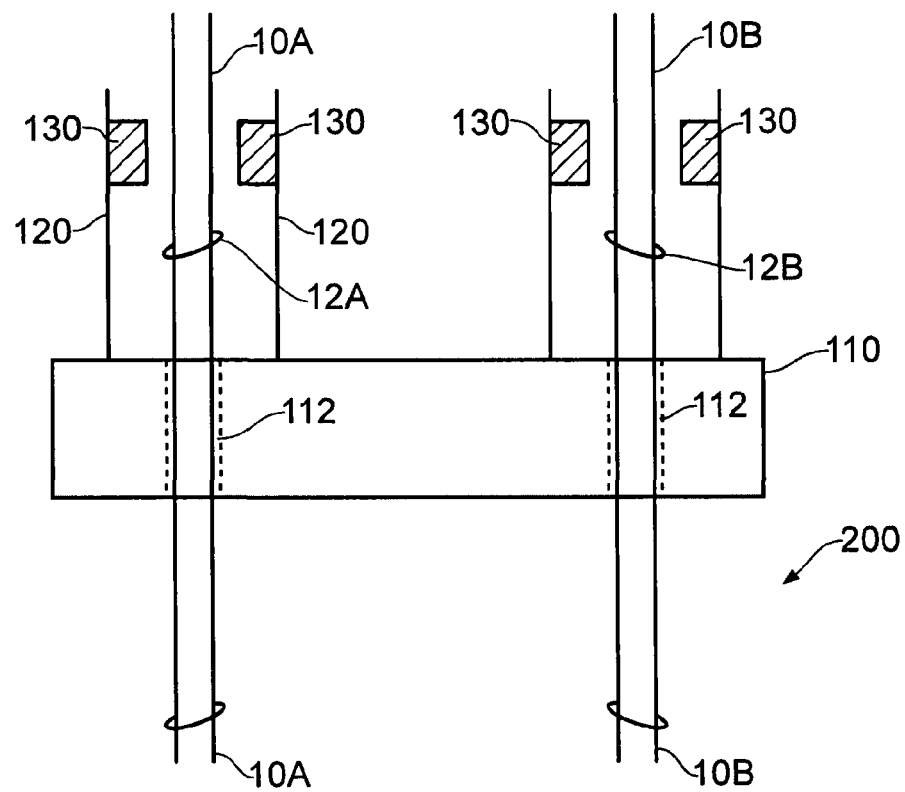

FIGS. 5C and 5D illustrate the apparatus 100 when it is in a repositioning configuration.

In FIG. 5C, the apparatus 100 is starting a repositioning of the drive carriages 130 so that they may perform another balanced insertion. The first drive carriage 130A has a configuration that is disengaged from the first helical pile 10A. It does not contact the first helical pile 10A and provides for linear axial movement of the first drive carriage 130A upwards relative to the first helical pile 10A. The second drive carriage 130B has a configuration that is disengaged from the second helical pile 10B. It does not contact the second helical pile 10B and provides for linear axial movement of the second drive carriage 130B upwards along the second helical pile 10B.

As the drive carriages 130 are repositioned, the first and second drive carriages 130A, 130B move axially along the guides 120 away from the sub-aqua earth 200, and relative to their respective first and second helical piles. 10.

In FIG. 5D, the apparatus 100 has finished the repositioning of the first and second drive carriages 130A. 130B and they have moved to a higher position compared to FIG. 5C.

Figure 6:
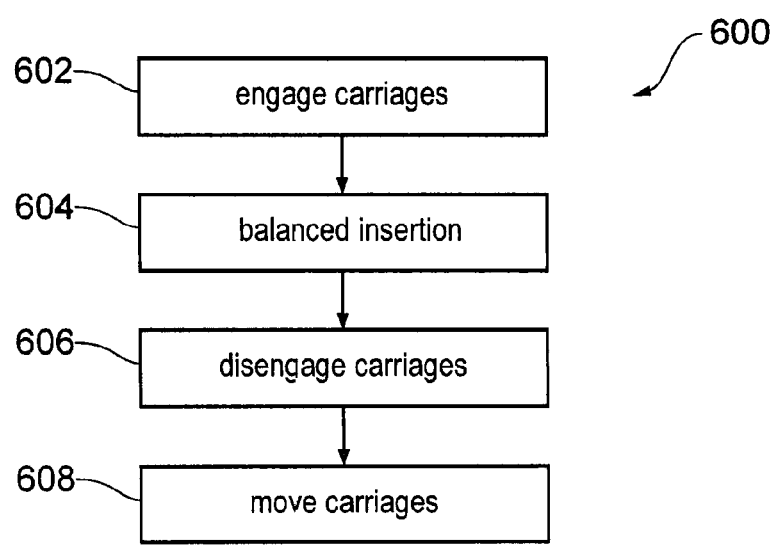
FIG. 6 illustrates an example of method performed by the apparatus illustrated in FIGS. 5A to 5D.

FIG. 6 illustrates a method 600 performed by the apparatus 100 illustrated in FIGS. 5A to 5D. The method 600 may be controlled by the controller 150.

The controller 150 is configured to control simultaneous operation of the drive carriages 130. This control is illustrated in FIG. 4A, in which output control signals 151 are used to control drivers 140.

The drivers 140 may, for example:

at block 602, control the apparatus 100 to have the insertion configuration, at block 604, control balanced insertion of multiple helical piles 10 (e.g. the first helical pile 10A and the second helical pile 10B) by controlling the rotational force (and direction) provided by each drive carriage 130 to its helical pile 10 and the linear axial force provided by each drive carriage 130 to it helical pile 10 in the insertion configuration, at block 606, control the apparatus 100 to have the repositioning configuration, and at block 608, control repositioning of the drive carriages 130 in the repositioning configuration.

Initially, as illustrated in FIG. 5D, the drive carriages 130 are in a repositioning configuration that allows relative movement between the drive carriages 130 and the helical piles 10A, 10B. The drive carriages 130 are also located towards the upper ends of the guides 120. In this configuration the helical piles 10A, 10B can be passed through the drive carriages 130 to contact the sub-aqua earth 200.

At block 602, the drive carriages 130 are controlled by controller 150 to change configuration from the repositioning configuration to the insertion configuration.

The drive carriages 130 engage with their respective helical piles 10A, 10B so that they can apply a rotational force and also a linear axial force towards the sub-aqua earth 200 during balanced insertion at block 602.

At block 602, the controller 150 may be configured to control the drive carriages 130 to have simultaneously an insertion configuration in which each of the drive carriages 130 engages with its associated helical pile 10.

At block 604, the controller 150 may be configured to individually control the rotational force provided simultaneously by each of the drive carriages 130 to its associated helical pile 10. Data from one or more sensors 180 associated with each of the drive carriages 130 may be used by the controller 150 in real time to control individually and dynamically the rotational force provided by each of the drive carriages 130 to its associated helical pile 10.

At block 606, the controller 150 may be configured to control the drive carriages 130 to have sequentially or simultaneously a repositioning configuration in which each of the drive carriages 130 disengages with its associated helical pile 10 and provides, at block 608, for movement of the drive carriages 130 relative to the associated helical piles 10.

As previously described, at block 604, the controller 150 may be configured to control a net torque on the body 110 arising from the simultaneous balanced insertion of the helical piles into the earth 200 by their respective drive carriages 130 so that the net torque on the body 110 is beneath a threshold or minimised. At least one of the helical piles 10 is a first helical pile 10A that is inserted clockwise. At least one of the helical piles 10 is a second helical pile 10B that is inserted counter-clockwise.

In some embodiments, the drive carriages 130 may be configured to provide either a clockwise torque to a helical pile 10 or a counter-clockwise torque to a helical pile 10. The direction of the torque may be controlled by the controller 150. In other embodiments, a particular drive carriage 130 is configured to provide only a clockwise torque to a helical pile 10, while a different particular drive carriage 130 is configured to provide only a counter-clockwise torque to a helical pile 10.

A drive carriage 130 may be configured to hold its position along the guides 120 relative to the body 110 in the absence of being driven up or being driven down.

FIG. 1 illustrates that a helical pile 10 is simultaneously driven linearly 30 in an axial direction towards the earth 200 and driven to rotate clockwise 20A or counter-clockwise 20B. FIGS. 5A-5B illustrate the use of a drive carriage 130 to simultaneously drive the helical pile 10 linearly in an axial direction towards the earth 200 and to rotate the helical pile 10 clockwise 20A or counter-clockwise 20B.

Figure 13A:
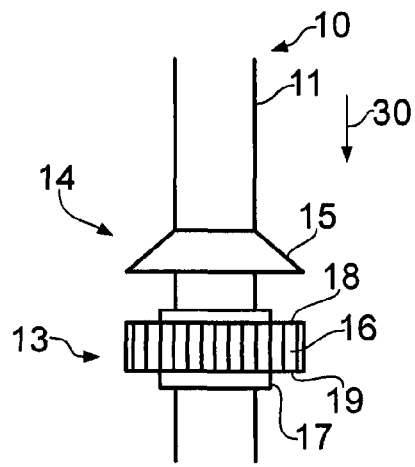
FIGS. 13A and 13B illustrate an example of a helical pile from a side view and from a perspective view.
Figure 13B:
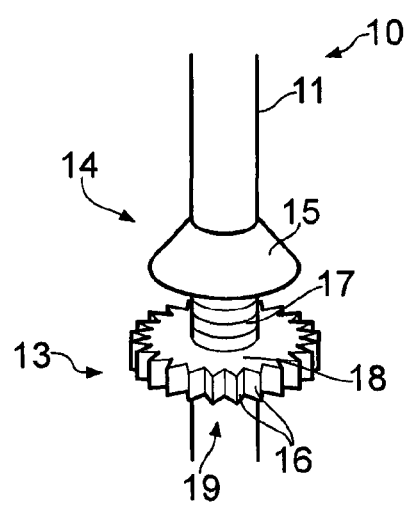

FIGS. 13A and 13B illustrate an example of a helical pile 10 from a side view and from a perspective view.

In these and other examples, the helical pile 10 has physical features formed by addition to or subtraction from a cylindrical shaft 11 of the helical pile 10. The physical features may, for example, provide rotation drive means 13 configured to contact the drive carriage 130 and transfer reaction forces from the drive carriage 130 that rotate the helical pile 10. The physical features may, for example, provide axial drive means 14 configured to contact the drive carriage 130 and transfer reaction forces from the drive carriage 130 that cause linear axial movement 30 of the helical pile 10.

The axial drive means 14 of the helical pile 10 may comprise at least a first abutment surface 15 that circumscribes an exterior of the shaft 11 and that has axially symmetry.

Figure 14:
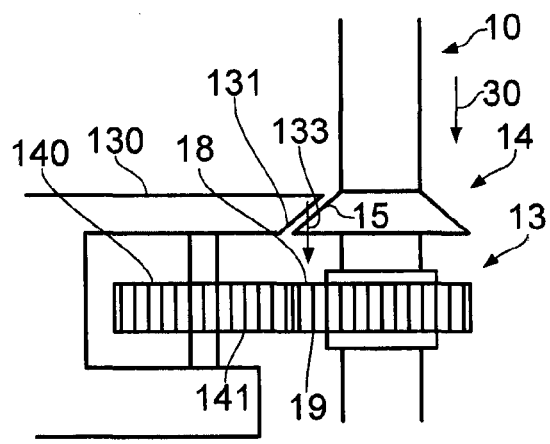
FIG. 14 illustrates an example of inter-coupling between the drive carriage and rotation drive means and axial drive means of the helical pile.

Referring to FIG. 14, the first abutment surface 15 is configured to be contacted by a first abutment surface 131 of the drive carriage 130. The contact provides a reaction force 133 from the drive carriage 130 to the helical pile 10 at least partially in a linear axial direction 30 towards an end of the helical pile 10 that is inserted first into the earth 200.

The rotation drive means 13 of the helical pile 10 may comprise at least radially-extending and circumferentially-distributed exterior abutment surfaces 16 that are sequentially contacted by a drive carriage to rotate the helical pile 10. For example, the helical pile may comprise an exterior fixed collar 17 that provides a circular gear 18 comprising radially extending gear teeth (cogs) 19 that are evenly distributed around the exterior circumference of the helical pile 10. The plane of the circular gear is orthogonal to the axis of the helical pile 10.

As illustrated in FIG. 14, the rotation driver 140 of the drive carriage 130 provides a rotatable circular gear wheel 141 whose cogs intermesh with the cogs 19 of the circular gear 18 of the helical pile 10 and that rotate the helical pile 10. In this example, but not necessarily all examples the circular gear wheel 141 of the drive carriage 130 and the circular gear wheel of the helical pile 10 are spur gears that lie in a common plane and rotate about parallel axes.

Figure 15:
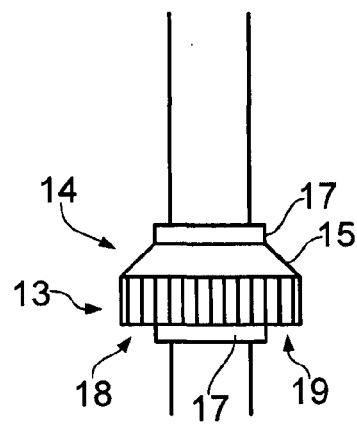
FIG. 15 illustrates an alternative helical pile in which rotation drive means and axial drive means are provided by a single apparatus welded to the shaft of the helical pile

FIG. 15 illustrates an alternative helical pile 10 in which the rotation drive means 13 and axial drive means 14 are provided by a single apparatus welded to the shaft 11 of the helical pile 10 via collar 17.

Figure 16A:
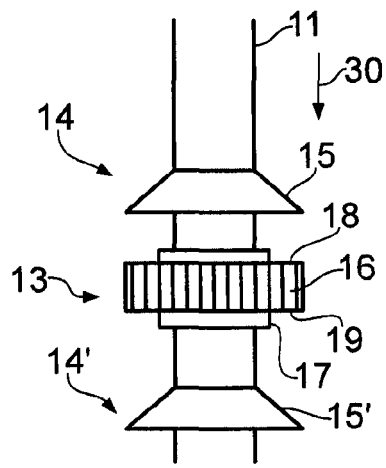
FIGS. 16A and 16B illustrate an example of a helical pile similar to that illustrated in FIG. 13A except that it comprises upper axial drive means and lower axial drive means.
Figure 16B:
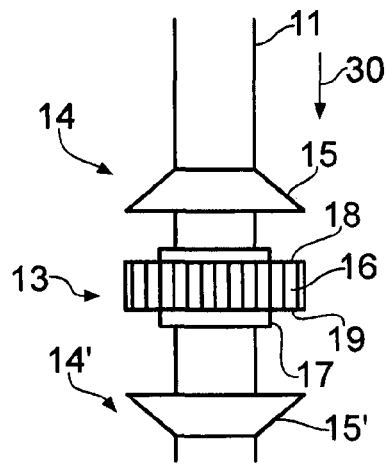

FIGS. 16A and 16B illustrate an example of a helical pile 10 similar to that illustrated in FIG. 13A except that it comprises upper axial drive means 14 of the helical pile 10 and lower axial drive means 14' of the helical pile 10

The upper axial drive means 14 may comprise at least a first upper abutment surface 15 that circumscribes the shaft 11 and that has axially symmetry. The first upper abutment surface 15 is configured to be contacted by a first upper abutment surface 131 of the drive carriage 130. The contact provides a reaction force 133 from the drive carriage 130 to the helical pile 10 at least partially in a linear axial direction 30.

The lower axial drive means 14' may comprise at least a first lower abutment surface 15' that circumscribes the shaft 11 and that has axially symmetry. The first lower abutment surface 15' is configured to be contacted by a first lower abutment surface of the drive carriage 130. The contact provides a reaction force 133 from the drive carriage 130 to the helical pile 10 at least partially in a linear axial direction 30.

The upper axial drive means 14 and the lower axial drive means 14' may be configured so that they are both used to move the helical pile in the same insertion direction. Alternatively, the upper axial drive means 14 and the lower axial drive means 14' may be configured so that one is used for insertion and the other is used for de-insertion (removal).

In another example, the rotation drive means 13, the upper axial drive means 14 and the lower axial drive means 14' may be provided by a single apparatus welded to the shaft 11 of the helical pile 10 via a collar.

Figure 17:
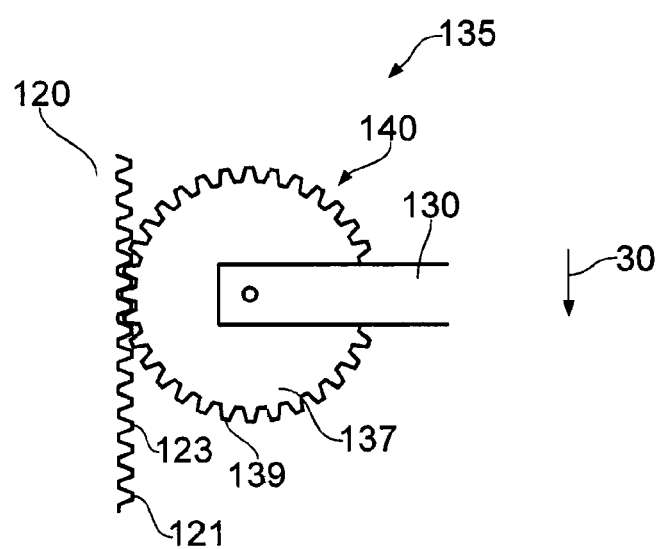
FIG. 17 illustrates an example of a rack and pinion gear system used to move the drive carriage in a linear axial direction relative to the guides of the apparatus.

FIG. 17 illustrates a rack and pinion gear system 135 which may be used to move the drive carriage 130 in a linear axial direction 30 relative to the guides 120. A rack 121 may be associated with each guide 120 and an axial driver 140 of the drive carriage 140 provides a rotatable pinion circular gear 137 whose cogs 139 mesh with the cogs 123 of the rack 121. The rotatable pinion circular gear 137 is fixedly attached to the drive carriage 130 to move the drive carriage 130 in the linear axial direction 30.

First helical piles 10A and the second helical piles 10B are the same except for the sense of rotation of the one or more helices 12 of the helical piles 10.

The helical piles 10 may be configured for sub-aqua foundations in this example. These particular examples of sub-aqua helical piles have a cylindrical shaft 11 that has a diameter exceeding 50 cm or 100 cm, although other diameters are possible. The helical piles 10 may be in sections. Each section is a helical pile 10. In some but not necessarily all examples, the sections may have a length of over 20 m.

The sectional piles 10 are configured such that a long pile can be built up by joining a number of sectional piles 10. The joints between the piles are configured so that they transmit clockwise and anticlockwise torque and compressive and tensile axial forces. Thus the piles can be inserted by rotation and axial forces in one direction and removed by rotation and axial forces in the other direction. The joints between the piles are configured to be released so that the long pile can be reduced to shorter piles for transportation.

The joints may physically separate the helices 12A of the helical pile 10 in an axial direction such that the helices 12 of the long pile lie on a virtual helix of fixed pitch that has its axis aligned with the axis of the long helical pile 10. The virtual helix may be a circular helix of fixed radius. This reduces disturbance to the earth on pile insertion.

There will therefore be a demand for a kit of parts comprising:

multiple helical piles 10 configured for insertion into sub-aqua earth 200 via the common inserting apparatus 100, and comprising one or more first helical piles 10A having one or more clockwise helices 12A and one or more second helical piles 10B having one or more counter-clockwise helices 12B The number of first helical piles 10A and the number of second helical piles 10B may be dependent upon the particular inserting apparatus 100.

From the foregoing it will be appreciated that the helical pile 10 is configured for insertion into earth 200 and may comprise cylindrical shaft 11; one or more helices 12 attached t the shaft 11 and physical features 13 formed by addition to or subtraction from the cylindrical shaft 11 of the helical pile 10 to enable at least rotation of the helical pile 10. Each of the helical piles 10 in the kit of parts may have identical physical features 13. Each of the helical piles 10 in the kit of parts may be identical except for the sense of the helices 12A, 12B.

The helical pile 10 may additionally comprise physical features 14 formed by addition to or subtraction from the cylindrical shaft 11 of the helical pile 10 to enable driving of the helical pile 10 in an axial direction 30 aligned with the axis of symmetry of the shaft 11. Each of the helical piles 10 in the kit of parts may have identical physical features 14. Each of the helical piles 10 in the kit of parts may be identical except for the sense of the helices 12A, 12B.

From the foregoing it will be appreciated that the helical pile 10 is configured for insertion into earth 200 and may comprise a cylindrical shaft 11; one or more helices 12 attached t the shaft 11 and rotation drive means 13 configured to transfer reaction forces to rotate the helical pile 10 and/or axial drive means 14 configured to transfer reaction forces that cause linear axial movement 30 of the helical pile 10.

Each of the helical piles 10 in the kit of parts may have identical rotation drive means 13. Each of the helical piles 10 in the kit of parts may be identical except for the sense of the helices 12A, 12B.

The rotation drive means 13 and axial drive means 14 may be provided independently or provided by a single apparatus welded to the shaft 11 of the helical pile 10.

The helical pile 10 may comprise upper axial drive means 14 and lower axial drive means 14' of the helical pile 10. The upper axial drive means 14 and the lower axial drive means 14' may be provided by a single apparatus welded to the shaft 11 of the helical pile 10. One of the upper axial drive means 14 and the lower axial drive means 14' may for insertion of the helical pile 10 and the other for de-insertion of the helical pile 10.

The helical pile 10 may comprise a first abutment surface 15 that circumscribes the shaft 11 and that has axially symmetry.

The helical pile 10 may comprise a upper abutment surface 15 that circumscribes the shaft 11 and that has axially symmetry and a lower abutment surface 15' that circumscribes the shaft 11 and that has axially symmetry.

The helical pile 10 may comprise radially-extending and circumferentially-distributed abutment surfaces 15. For example, the helical pile 10 may comprise a circular gear 18 comprising radially extending gear teeth 19 that are evenly distributed around the circumference of the helical pile 10.

Each of the helical piles 10 in the kit of parts may have identical circular gears 18. Each of the helical piles 10 in the kit of parts may be identical except for the sense of the helices 12A, 12B.

Figure 7A:
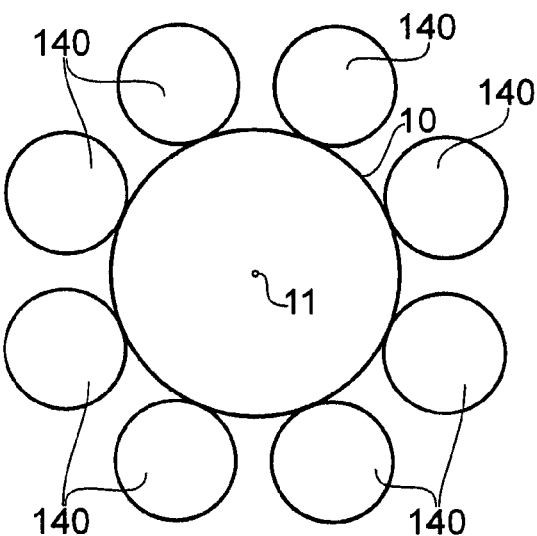
FIGS. 7A and 7B illustrate different configurations of an example of a rotation driver arrangement in a drive carriage.
Figure 7B:
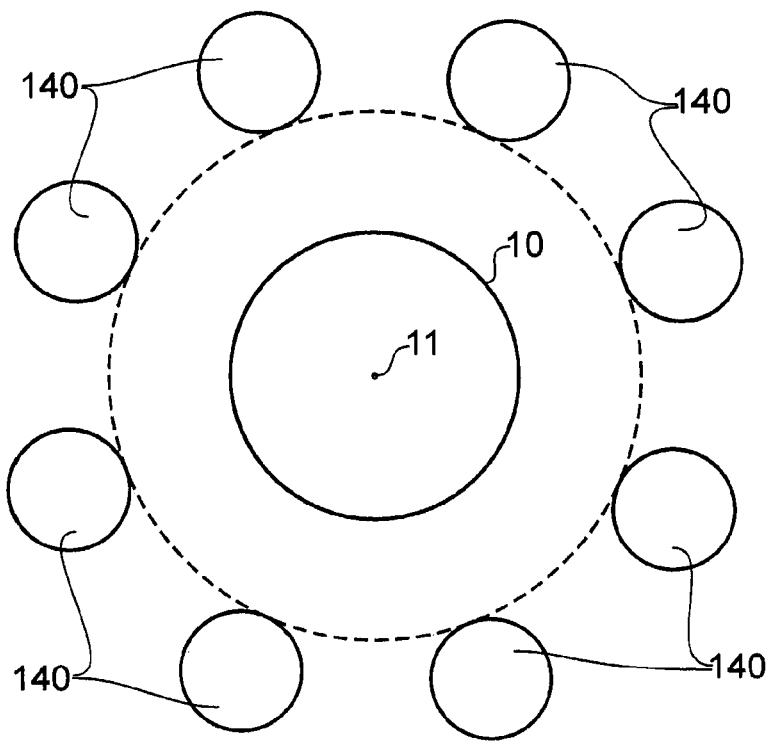

As illustrated in FIGS. 7A and 7B each drive carriage 130 may comprise a rotation driver arrangement comprising a plurality of rotation drivers 140 for rotating the received helical pile 10. FIG. 7A illustrates a circular arrangement of rotation drivers 140 when the drive carriage 130 is in the insertion configuration. FIG. 7B illustrates a circular arrangement of the rotation drivers 140 when the drive carriage 130 is in the repositioning configuration.

The rotation drivers 140 are positioned circumferentially around the helical pile 10 with equal spacing between them. The helical pile 10 has a circular cross-section.

In the insertion configuration illustrated in FIG. 7A each of the rotation drivers 140 engages with the received helical pile 10. Each of the rotation drivers 140 may be biased to push against the received helical pile 10. The engagement may be between cogs of the rotation drivers 140 and cogs 19 of a cog collar portion 13 extending circumferentially around the helical pile 10.

Each of the plurality of rotation drivers 140 is configured to apply a rotational force to the helical pile 10. If the helical pile 10 is a first helical pile 10A, the rotation is in the clockwise sense whereas if it is a second helical pile 10B, the rotation is in the counter-clockwise sense. Some or all of the plurality of rotation drivers 140 may be configured to simultaneously apply a rotational force to the helical pile 10.

In the repositioning configuration, illustrated in FIG. 7B, the rotation drivers 140 are moved away from the rotation axis 11 of the helical pile 10 sufficiently to enable the drive carriage 130 to move over a helix 12 of the received helical pile 10.

The movement of the drivers 140 so that they move from lying on a circle of smaller diameter (FIG. 7A) to lying on a circle of larger diameter (FIG. 7B) may be achieved using a hydraulic ram arrangement comprising hydraulic rams 134. The controller 150 may control the hydraulic rams 134 via configuration control drivers 140.

Figure 8A:
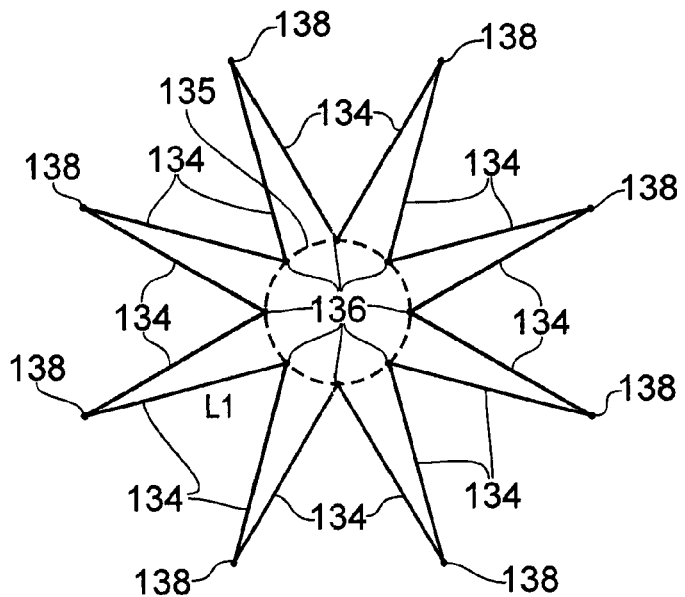
FIGS. 8A and 8B illustrate different configurations of an example of an hydraulic ram arrangement in a drive carriage.
Figure 8B:
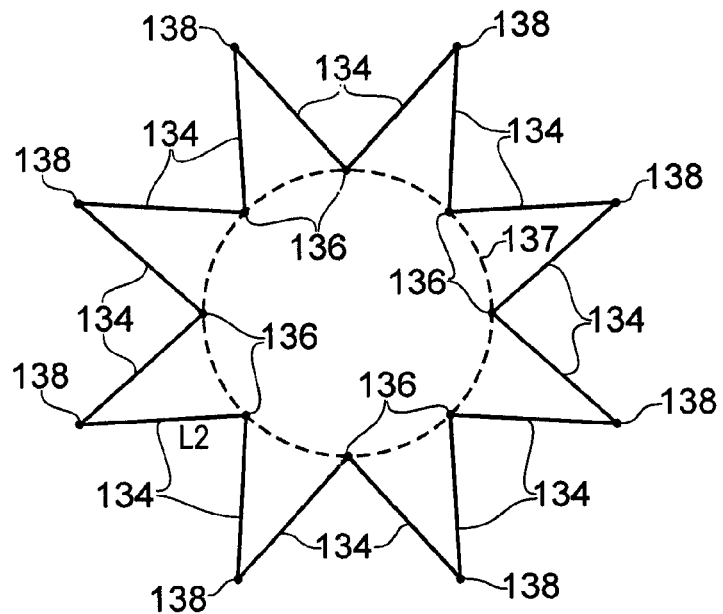

In FIGS. 8A and 8B, a particular hydraulic ram arrangement is illustrated. However, other arrangements are possible. In this arrangement, each rotation driver 140 would be fixed to an interior pivot 136. Each interior pivot 136 is connected to its two nearest exterior pivots 138 via two hydraulic rams 134. In the example of FIGS. 8A and 8B there are M interior pivots 136, M exterior pivots and 2M hydraulic rams 134 of equal length. The exterior pivots 138 are located, with equal spacing, on a virtual circle that is centered on the rotation axis 11 of a received helical pile 10.

In FIG. 8A, which corresponds to the insertion configuration, the hydraulic rams 134 have an equal length L1. This results in the M interior pivots 136 lying on a small radius circle 135 that is centrally positioned.

In FIG. 8B, which corresponds to the repositioning configuration, the hydraulic rams 134 have an equal length L2 (less than L1). This results in the M interior pivots 136 lying on a larger radius circle 137 that is centrally positioned.

In FIG. 8A, it is possible to set a different insertion configurations for the hydraulic ram arrangement by changing the lengths of the hydraulic rams 134. For example, the position at which the small radius circle 135 is located can be moved and/or the diameter of the small radius circle 135 can be changed.

In FIG. 8B, it is possible to set a different repositioning configurations for the hydraulic ram arrangement by changing the lengths of the hydraulic rams 134. For example, the position at which the large radius circle 137 is located can be moved and/or the diameter of the large radius circle 137 can be changed.

Each drive carriage 130 is therefore configured to independently align its rotation drivers 140, located at the interior pivots 136, with the respective helical piles 10.

The configuration control drivers 140, under the control of controller 150 may thus independently control the locations with which each helical pile 10 is axially aligned.

Figure 9:
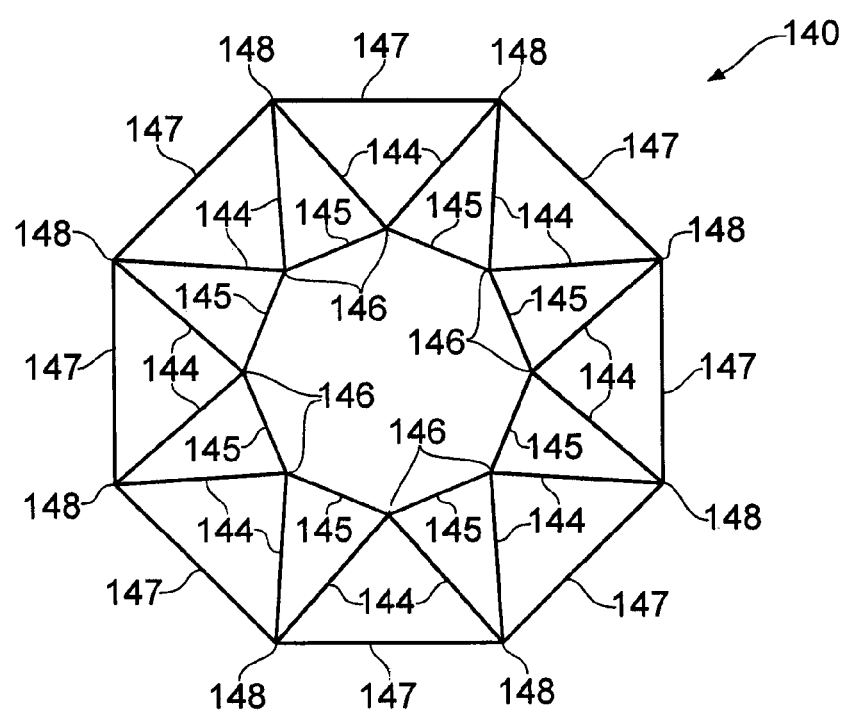
FIG. 9 illustrates an example of a support framework for a drive carriage.

FIG. 9 illustrates a support framework 140 for a drive carriage 130 that can support the rotation driver arrangement and hydraulic ram arrangement illustrated in FIGS. 7A, 7B, 8A and 8B.

There are M interior nodes 146 positioned on a circle. Adjacent ones of the M interior nodes 146 are interconnected by supports 145 to form an interior regular M sided rigid polygonal frame.

There are eight exterior nodes 148 positioned on a virtual circle of larger radius. Adjacent ones of the eight exterior nodes 148 are interconnected by supports 147 to form an exterior octagonal frame.

Each interior node 146 is connected to its two nearest exterior nodes 148 via two supports 144.

The rigid supports 144, 145, 147 are fixed length supports. They may be lengths of tubular steel.

Figure 10A:
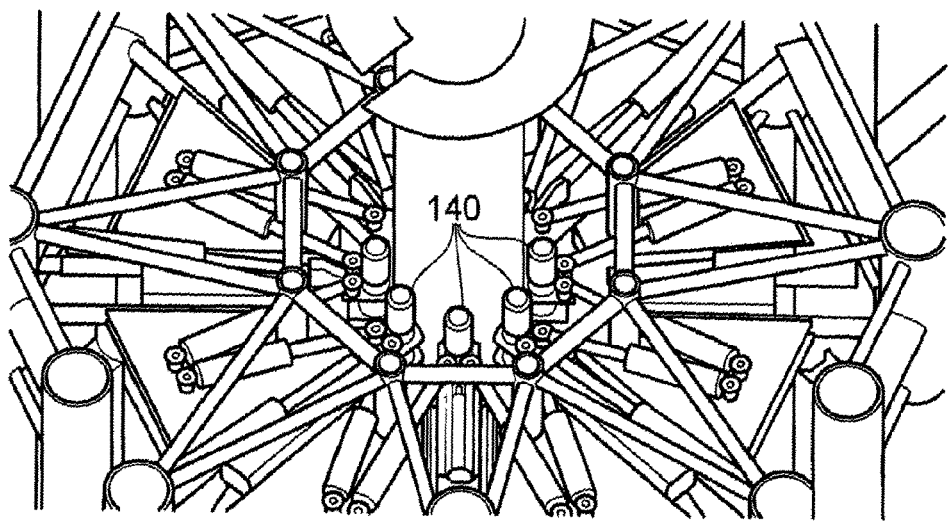
FIGS. 10A and 10B illustrate an example of a drive carriage in which a support framework as illustrated in FIG. 9 supports an example of the rotation driver arrangement of FIGS. 7A and 7B and an example of the hydraulic ram arrangement of FIGS. 8A and 8B.
Figure 10B:
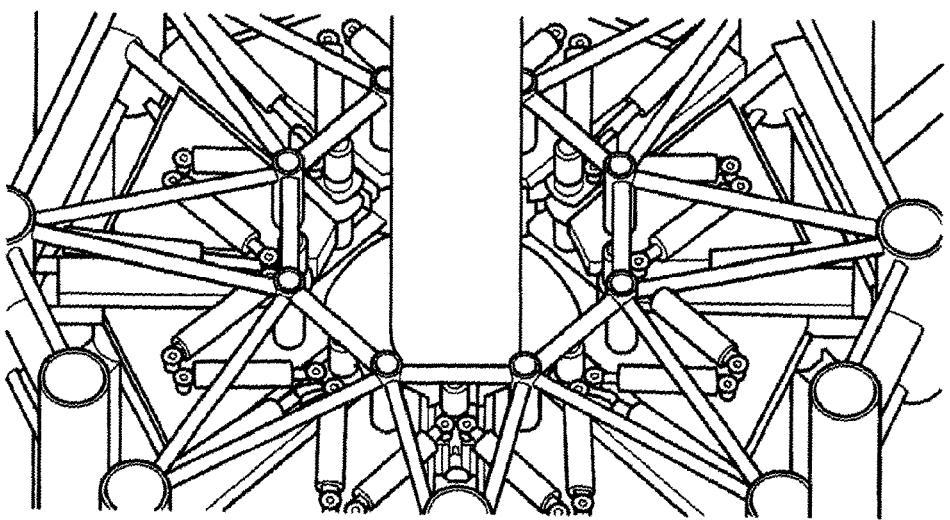

FIGS. 10A and 10B illustrate a drive carriage 130 in which a support framework 140 as illustrated in FIG. 9 supports an example of the rotation driver arrangement of FIGS. 7A and 7B and an example of the hydraulic ram arrangement of FIGS. 8A and 8B. FIG. 10A corresponds to the insertion configuration and FIG. 10B corresponds to the repositioning configuration.

Figure 11:
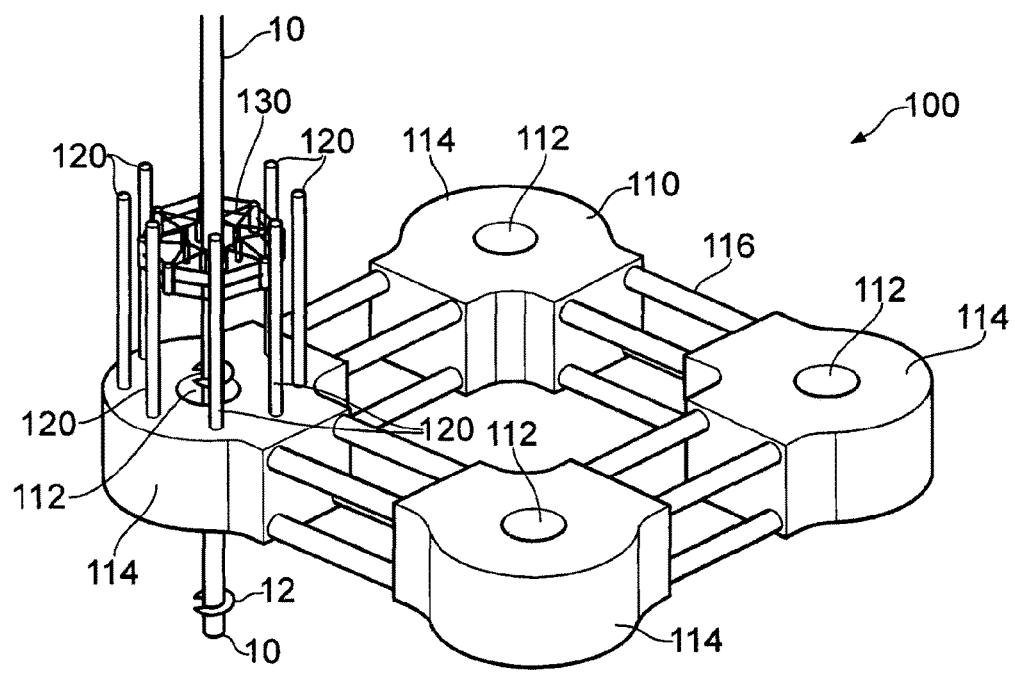
FIG. 11 illustrates, as an example, the drive carriage illustrated in FIGS. 10A and 10B as part of an apparatus.

FIG. 11 illustrates the drive carriage 130 illustrated in FIGS. 10A and 10B as part of an apparatus 100, as previously described. Although guides 120, a drive carriage 130 and a helical pile are illustrated at only one of the aperture 112 of the body 110, in use, each of the apertures would have guides 120, a drive carriage 130 and a helical pile 10. One pair of diagonally opposing apertures would receive first helical piles 10A and the other pair of diagonally opposing apertures 112 would receive second helical piles 10B.

In this example, the body 110 comprises four ballast tanks 114. An aperture 112 extends through each ballast tank 114. The ballast tanks 114 are hermetically sealed tanks which may be flooded with water to sink the body 110 (and apparatus 100) and filled with air to float the body 110 (and apparatus 100).

The four ballast tanks 114 are positioned at the corners of a square. The ballast tank 114 at each corner is interconnected to its two nearest neighbour ballast tanks via struts 116. Four parallel struts 116, arranged in a square configuration, are used to interconnect pairs of ballast tanks 114.

The struts 116 may be formed from tubular steel.

It may be possible to change the length of the struts 116.

In this example, as in the preceding examples, a first helical pile 10A has only one or more clockwise helices 12A and no counter-clockwise helices. Likewise, as in the preceding examples, a second helical pile 10B has only one or more counter-clockwise helices 12B and no clockwise helices. The first helical piles 10A and the second helical piles 10B are the same except for the sense of rotation of the one or more helices 12 of the helical piles 10.

The helical piles 10 are configured for sub-aqua foundations in this example. These particular examples of sub-aqua helical piles have a cylindrical body that has a diameter exceeding 50 cm or 100 cm, although other diameters are possible. The helical piles 10 may be in sections. In some but not necessarily all examples, the sections may have a length of over 20 m.

Figure 12:
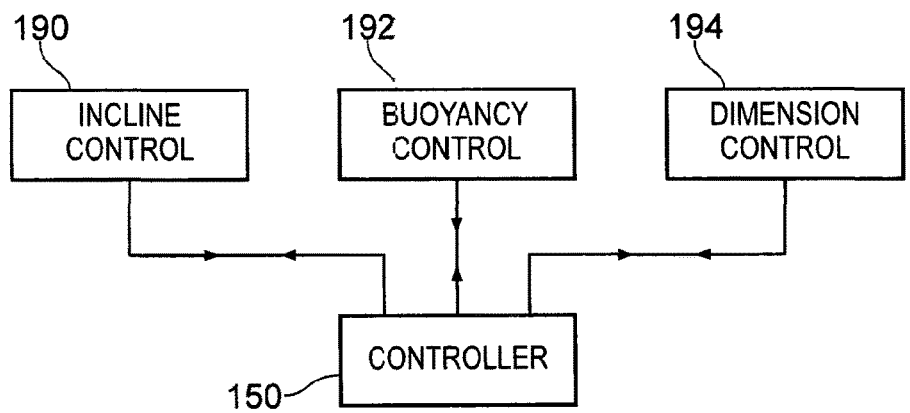
FIG. 12 illustrates an example of a control system.

FIG. 12 illustrates a system in which the controller 150 is configured to control incline of the body 110. The controller may control 190 a plurality of hydraulic levelling jacks configured to control an incline (pitch, roll) of the body 110.

FIG. 12 illustrates a system in which the controller 150 is configured to control the dimensions of the body 110 and relative positioning of the apertures 112. The controller may control 194 the length of the struts 116.

After the helical piles have been inserted, the apparatus 100 is removed, for example, by placing the apparatus 100 in its repositioning configuration and then, moving the body relative to the piles 10 by making the body 110 positively buoyant. The helical piles 10 including the first helical pile(s) 10A and the second helical pile(s) 10B remain inserted within the ground 200.

FIG. 12 illustrates a system in which the controller 150 is configured to control buoyancy of the body 110. The controller 150 may control 192 the quantities of air and water in a plurality of ballast tanks 114 to control buoyancy of the body 110.

Figure 18A:
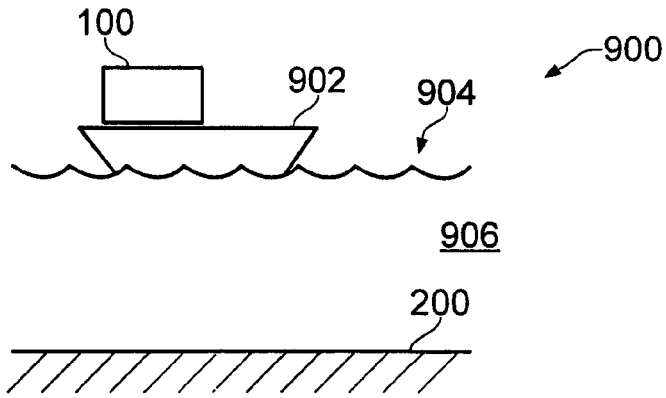
FIGS. 18A and 18B illustrate an example of a system for deploying the apparatus from a surface vessel.
Figure 18B:
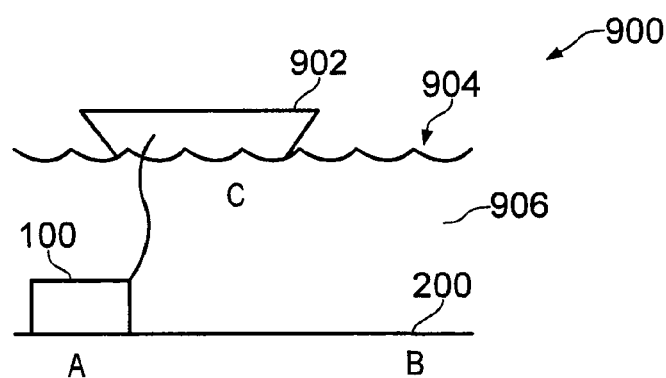

FIGS. 18A and 18B illustrate an example of a system 900 for deploying the apparatus 100 from a surface vessel 902 that is floating on the surface 904 of the water 906. In this example a flexible tether 905 connects the vessel 902 and apparatus 100. The tether may, for example, be used to communicate hydraulic power to the apparatus 100 and/or control signals to the apparatus 100 and/or sensor signal from the apparatus 100 and/or air to the apparatus for buoyancy control.

The vessel 902 may be a relatively small vessel compared to those currently used to pile drive in sub-aqua environments because the vessel 902 does not need to be fixedly connected to the earth 200 but can move relative to the earth 200 during insertion of the piles 10 by the apparatus 100. As there is no fixed relationship between the vessel 902 and the apparatus 100 pile insertion may therefore occur in sea swells, at any depth and in adverse weather conditions.

FIG. 18B illustrates that balance pile insertion may occur at multiple locations A and B without moving the vessel from location C.

Figures 19A, 19B, 19C:
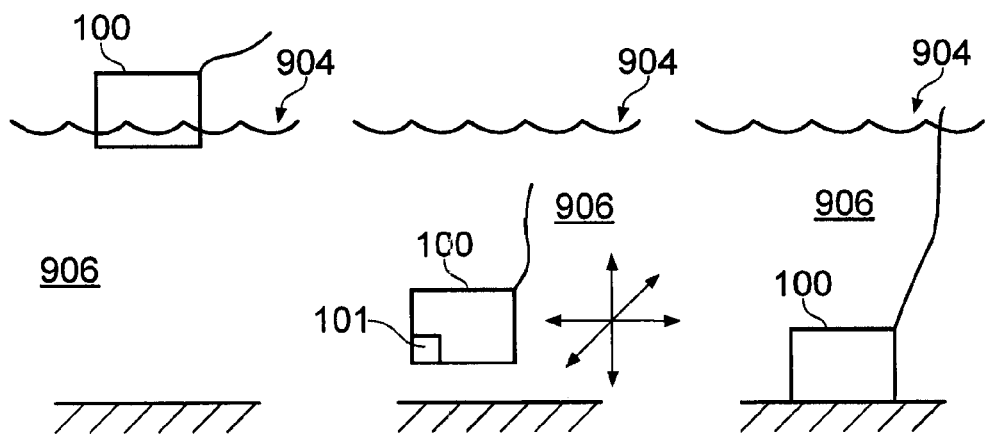
FIGS. 19A, 19B and 19C illustrate an example of deployment of the apparatus.

The deployment of the apparatus 100 is illustrated in more detail in FIGS. 19A, 19B, 19C.

In FIG. 19A the apparatus 100 is positively buoyant and is floating on the water surface 904. The controller 150 may control 192 the quantities of air and water in a plurality of ballast tanks to control buoyancy of the apparatus 100.

The controller 150 may control 192 the quantities of air and water in a plurality of ballast tanks to control buoyancy of the apparatus 100 and make it slightly negatively buoyant so that the apparatus 100 submerges below the surface 904 and moves towards the sub-aqua earth 200.

The controller 150 may control 192 the quantities of air and water in a plurality of ballast tanks to control buoyancy of the apparatus 100 and make it slightly negatively buoyant to descend, slightly positively buoyant to ascend or neutrally buoyant to remain level.

As illustrated in FIG. 19B, a propulsion system 101 of the apparatus 100 may be used to move the apparatus 100 independently of the vessel 902 laterally and possibly up and/or down while the apparatus 100 is below the surface 904 and above the sub-aqua earth 200. The propulsion system 101 may also control orientation of the apparatus 100.

The apparatus 100 and the vessel 902 may move relative to one another. The vessel 902 may move up and down, move laterally or remain in location and the apparatus 100 may move up and down and laterally.

As illustrated in FIG. 19C, when the apparatus 100 has been manoeuvred to the desired location and orientation the controller 150 may control 192 the quantities of air and water in a plurality of ballast tanks to control buoyancy of the apparatus 100 and place the apparatus 100 onto the sub-sea earth 200. The extent to which the weight of the apparatus 100 is transferred to the sub-sea earth 200 is controlled by controlling the apparatus buoyancy. The apparatus 100 may be made significantly negatively buoyant to enable the initial insertion of the helical piles 10 into the sub-aqua earth 200.

In some but not necessarily all embodiments, the apparatus may use a suction mechanism to anchor the apparatus 100 to the sub-aqua earth for initial insertion of the helical piles 10.

The apparatus 100 may, for example, have a mass of up to several hundred tonnes and may have ballast tanks of several hundred cubic meters.

Figure 20:
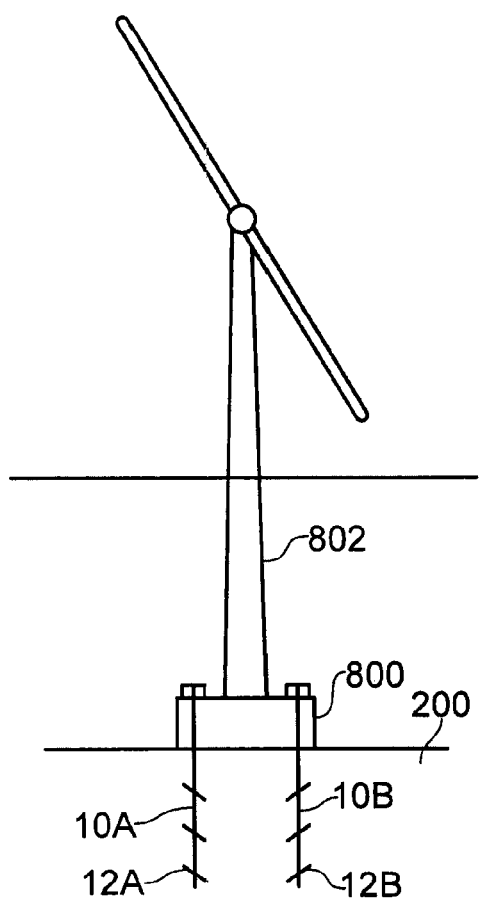
FIG. 20 illustrates an example of a sub-aqua structure attached to sub-aqua earth via the inserted helical piles after removal of the inserting apparatus.

FIG. 20 illustrates an example of a sub-aqua structure 800 attached to the sub-aqua earth 200 via the helical piles 10 after removal of the inserting apparatus 100. The figure illustrates the presence of first helical piles 10A and second helical piles 10B in the finished structure.

In this example, the sub-aqua structure supports a vertical stiff support 802. The support 802 may be used to support other structures or equipment, for extracting hydrocarbons, or generating electricity from wind, tides, currents or waves. In other examples, the sub-aqua structure 800 may be an anchor, tether or other restraint for jetties, buoys, bridges or related structures and vessels.

It will therefore be appreciated that the foregoing description enables the production of permanent installations within the sea, distant from the shore or near to the shore, founded on the sub-aqua earth (e.g. seabed) without repeated blows from a mechanically driven hammer. This means that disturbance to the sub-aqua (e.g. marine) fauna or costal residents through noise and vibration is small.

It will therefore be appreciated that the foregoing description enables the production of sub-aqua foundations using large scale piles. The magnitude of torque required to install a helical screw pile is dependent on the physical size of the pile, the intended depth of penetration into the earth, and the characteristics of the earth. Piles sufficient to support large offshore structures, subjected to high loading in a harsh environment will necessarily be of a large scale in themselves, requiring a correspondingly high torque to install. The use of balanced insertion, as described above, reduces the torque on the inserting apparatus 100. The inserting apparatus 100 therefore needs to withstand lower loads and may be made smaller and lighter and may be positioned adjacent the sub-aqua earth. This avoids the use of large scale and costly offshore construction equipment and processes.

It also avoids the use of hammer driving piles close to the shore. If the UK installs 20 GW of wind turbines in the next 20 years that may require 4000 turbines, each of which has a jacket foundation that requires 4-8 piles. That's 16 k-32 k piles. The environmental consequence of driving this number of piles conventionally is unacceptable because of the potential impact on marine mammals such as whales and dolphins. These mammals are susceptible to the noise at distances of tens of miles from the worksite. With large numbers of turbines being installed simultaneously there will be nowhere for marine mammals to go. Thus an alternative means of pile installation is required.

Piled foundations are cheaper than other foundations, e.g. gravity bases, which require uneconomic quantities of material.

The use of the sub-aqua inserting apparatus 100 should also allow the use of smaller installation vessels than using a conventional pile hammer.

It will be appreciated that the balanced insertion of helical piles 10 requires the use of both first helical piles 10A and second helical piles 10B. The proportion of first helical piles 10A used compared to second helical piles 10B used for a particular body 110 is fixed. For example, the ratio for the body illustrated in FIG. 11 is 1:1. Other bodies 110 may have other ratios.

In order to reuse an inserting apparatus 100 for the creation of more than one foundation, it will be necessary to resupply the installer with helical piles 10 in the correct ratio.

Although the foregoing description has focused on the formation of sub-aqua foundations using helical piles, it should be appreciated that aspects have broader application. For example, a method of inserting comprising: simultaneously inserting multiple helical screws via a common inserting apparatus, wherein at least a first helical screw of the multiple helical screws has at least one clockwise helix and wherein at least a second helical pile of the multiple helical piles has at least one counter-clockwise helix.

Although the memory 162 is illustrated as a single component in FIG. 4B it may be implemented as one or more separate components some or all of which may be integrated/removable and/or may provide permanent/semi-permanent/dynamic/cached storage.

Although the processor 160 is illustrated as a single component in FIG. 4B it may be implemented as one or more separate components some or all of which may be integrated/removable.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIGS. 3 and 6 may represent steps in a method and/or sections of code in the computer program 164. The illustration of a particular order to the blocks does not necessarily imply that there is a required or preferred order for the blocks and the order and arrangement of the block may be varied. Furthermore, it may be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of manufacturing a sub-aqua foundation comprising:
   simultaneously inserting one or more first helical piles and one or more second helical piles into the sub-aqua earth via a common inserting apparatus, wherein a first helical pile has one or more clockwise helices and wherein a second helical pile has one or more counter-clockwise helices,
   wherein the common inserting apparatus comprises a body with apertures for receiving the one or more first helical piles and the one or more second helical piles, a drive carriage associated with each of the one or more first helical piles and the one or more second helical piles and configured to insert the associated helical pile into the sub-aqua earth via a respective body aperture, and guides configured to align each of the drive carriages with the respective body aperture and prevent rotation of the drive carriages relative to the respective body aperture, the method comprising: controlling operation of the drive carriages, the method comprising controlling dimensions of the body and relative positioning of the apertures.

2. A method as claimed in claim 1, comprising simultaneously inserting the first helical piles and the second helical piles into the sub-aqua earth via the common inserting apparatus by rotating the one or more first helical piles in a clockwise sense and rotating the one or more second helical piles in a counter-clockwise sense, while simultaneously driving the rotating one or more first helical piles and the rotating one or more second helical piles towards sub-aqua earth.

3. A method as claimed in claim 1, comprising dynamically controlling simultaneous driving insertion of the first helical piles and the second helical piles into the sub-aqua earth via the common inserting apparatus to maintain a net torque on the common inserting apparatus beneath a threshold or to minimize a net torque on the common inserting apparatus caused by the rotations of the helical piles beneath a threshold.

4. A method as claimed in claim 1 comprising using data from one or more sensors at the common inserting apparatus to control dynamically and simultaneously the rotation of the first helical piles and the second helical piles into the sub-aqua earth via the common inserting apparatus.

5. A method as claimed in claim 1, comprising controlling incline and/or positioning and/or orientation of a whole or part of the common inserting apparatus.

6. A method as claimed in claim 1, comprising interconnecting the common inserting apparatus and a surface vessel via a flexible tether for communicating hydraulic power to the common inserting apparatus and/or for transferring control signals to the common inserting apparatus and/or for transferring sensor signals from the common inserting apparatus and/or for transferring air to the common inserting apparatus for buoyancy control.

7. A method as claimed in claim 1, comprising controlling a position of the common inserting apparatus independently of a position of a surface vessel that controls the insertion of the first and second helical piles and controlling an orientation of the common inserting apparatus independently of an orientation of a surface vessel that controls the insertion of the first and second helical piles or controlling an orientation of a surface vessel that controls the insertion of the first and second helical piles independently of an orientation of the common inserting apparatus.

8. A method as claimed in claim 1, comprising removing the common inserting apparatus while leaving the first helical piles and the second helical piles.

9. A method as claimed in claim 1, comprising controlling linear forces provided by the drive carriages to their associated helical piles.

10. A method as claimed in claim 1, comprising controlling the drive carriages to have simultaneously an insertion configuration in which each of the drive carriages engages with its associated helical pile.

11. An apparatus, for simultaneously inserting multiple helical piles into the earth, comprising:
a body comprising at least a first aperture for receiving a first helical pile, having one or more clockwise helices, and a second aperture for receiving a second helical pile, having one or more counter-clockwise helices;
first guides associated with the first aperture;
second guides associated with the second aperture;
a first drive carriage configured to move linearly relative to the first aperture of the body along the first guides and to rotate simultaneously the received first helical pile in a clockwise sense; and
a second drive carriage configured to move linearly relative to the second aperture of the body along the second guides and to rotate simultaneously the received second helical pile in a counter-clockwise sense.

12. An apparatus as claimed in claim 11, wherein the first drive carriage comprises a plurality of first drivers configured to be positioned around the first helical pile, wherein each of the plurality of first drivers is configured to simultaneously apply a rotational force to the first helical pile and wherein the second drive carriage comprises a plurality of second drivers configured to be positioned around the second helical pile, wherein each of the plurality of second drivers is configured to simultaneously apply a rotational force to the second helical pile, wherein the first drive carriage comprises a first plurality of hydraulic rams configured to push simultaneously first drivers towards a rotation axis of the received first helical pile during an insertion configuration and configured to withdraw the first drivers away from the rotation axis of the first helical pile sufficiently to enable the first drive carriage to move over a helix of the received first helical pile during a repositioning configuration and
the second drive carriage comprises a second plurality of hydraulic rams configured to push simultaneously second drivers towards a rotation axis of the received second helical pile during an insertion configuration and configured to withdraw the second drivers away from the rotation axis of the second helical pile sufficiently to enable the second drive carriage to move over a helix of the received second helical pile during a repositioning configuration,
wherein the first drive carriage is configured to be controlled to have an insertion configuration in which the first drive carriage is configured to engage with the first helical pile and wherein the second drive carriage is configured to be controlled to have an insertion configuration in which the second drive carriages is configured to engage with the second helical pile
wherein the first drive carriage is configured to be controlled to have a repositioning configuration in which the first drive carriage is configured to disengage from the first helical pile and to provide for movement of the first drive carriage relative to the first helical pile and wherein the second drive carriage is configured to be controlled to have a repositioning configuration in which the second drive carriage is configured to disengage from the second helical pile and to provide for movement of the second drive carriage relative to the second helical pile.

13. An apparatus as claimed in claim 11, comprising a plurality of hydraulic leveling jacks configured to control an incline of the body and comprising ballast tanks for controlling the buoyancy of the apparatus.

14. An apparatus as claimed in claim 11, wherein the body has controllable dimensions and is configured to enable variation of the relative position of the first aperture and the second aperture.

15. An apparatus as claimed in claim 11, further comprising an interface for connection of a flexible tether between the apparatus and a surface vessel, wherein the interface is for communicating power to the apparatus and/or for transferring control signals to the apparatus and/or for transferring sensor signals from the apparatus and/or for transferring air to the apparatus for buoyancy control.

16. An apparatus as claimed in claim 11, comprising a propulsion system configured to control a position of the apparatus independently of a position of a surface vessel that controls the apparatus and to control an orientation of the apparatus independently of a position of a surface vessel that controls the apparatus.

17. An apparatus as claimed in claim 11, comprising a suction mechanism for sucking the apparatus to the sub-aqua earth.

18. A system comprising the apparatus as claimed in claim 11, and further comprising a controller configured to control simultaneous operation of the first drive carriage and the second drive carriage wherein the controller is configured to control a position of the apparatus independently of a position of a surface vessel that controls the apparatus, is configured to control an orientation of the apparatus independently of a position of a surface vessel that controls the apparatus and is configured to control buoyancy of the apparatus.

19. A system comprising the apparatus as claimed in claim 11, further comprising the first helical pile and the second helical pile wherein the first helical pile and the second helical pile are configured for subsea foundations, wherein the first helical pile and the second helical pile comprise external configurations configured to enable simultaneous insertion and rotation.

* * * * *